United States Patent Office 3,071,814
Patented Jan. 8, 1963

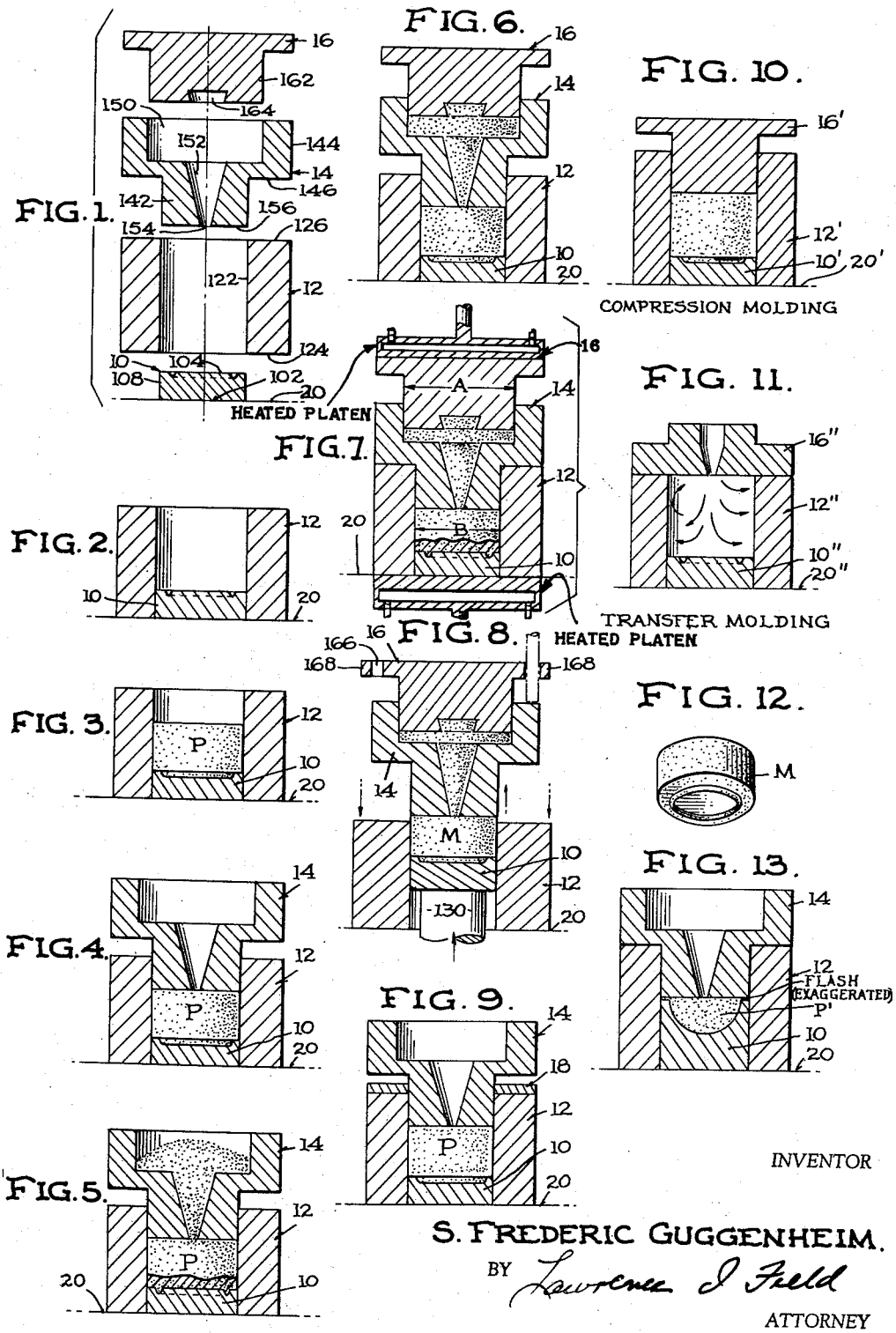

3,071,814
METHOD AND APPARATUS FOR MOLDING
S. Frederic Guggenheim, 101 Grayson Place,
Teaneck, N.J.
Filed May 19, 1960, Ser. No. 30,178
4 Claims. (Cl. 18—42)

This invention relates to a method and apparatus for producing moldings having all dimensions including those determined by the closure distance between mold forces held within closely controlled limits and having improved physical and electrical properties. More particularly the invention is concerned with the production of components, molded from synthetic resinous polymer compositions, with improved physical, dimensional and electrical properties.

Three methods of molding plastic articles are commonly employed in present-day mass production manufacturing installations, namely: compression molding, injection molding and transfer molding. Each has its advantages and disadvantages and therefore each method finds application in accordance with its distinguishing features. Compression molding, particularly if a preform is charged into the mold cavity, has the particular advantage, for certain types of molding, that very little flow of plastic is required for the molding to reach its final configuration. Therefore, relatively few variations in the physical properties of the various parts of the molding, which physical properties may be affected by flow pattern, occur. Compression molding has the disadvantage, for other applications, that dimensions in the direction of motion of the mold forces are dependent on the amount of plastic charged into the mold and on temperature and pressure cycles in the molding operation. Injection and transfer molding, on the other hand, insure rather close control over all dimensions of the molded object but require intense flow in the plastic during the injection or transfer operation. None of the methods is entirely adequate for producing moldings in which one dimension is held within very close tolerances, and in which at the same time flow patterns are minimized during molding.

It is a principal object of the present invention to provide a molding method and apparatus which will provide close control of all dimensions, yet will limit the flow of plastic during the molding operation.

Briefly, in accordance with the present invention, a process has been devised in which articles may be mass-produced with reproducible and enhanced physical and electrical properties.

The method and an apparatus for carrying out the method are schematically shown in the drawings accompanying this specification. In the figures:

FIGURE 1 is an exploded schematic view of a mold suitable for the present invention;

FIGURE 2 shows the mold prior to assembly and filling;

FIGURE 3 shows the mold after a preform has been charged therein;

FIGURE 4 shows the mold when assembled for completion of charging;

FIGURE 5 shows the mold after completing the charging of same;

FIGURE 6 shows the mold during the initial stages of molding;

FIGURE 7 shows the mold after molding is completed;

FIGURE 8 shows one manner of ejection or clearing of the mold;

FIGURE 9 shows a modified mold in assembled condition, corresponding to the stage of the process shown in FIGURE 4;

FIGURE 10 shows a prior art compression mold after charging and before molding;

FIGURE 11 is a similar view of a prior art transfer mold;

FIGURE 12 is an isometric of a completed molding produced in the mold of FIGURES 1–9; and FIGURE 13 is a view of another mold utilizing the invention.

In the drawings, similar elements have been given the same reference designations. FIGURES 1–7 are intended to show schematically the use of a mold for producing a generally cylindrical shaped object, such as the molding M shown in FIGURE 12, which represents the track carrying element of a potentiometer such as that shown in Patent 2,700,719. One portion of the mold consists of base 10. Base 10 has a flat lower surface 102 adapted to rest on a press platen or other firm foundation 20. Base 10 also has a raised upper surface which may be planar or which may be provided with recesses or protuberances depending on the configuration desired in the finished molded product. In the preferred form shown, base 10 has a raised central area 104 and upstanding shoulders 108, which fit snugly within the interior of member 12 defining the sidewalls of the mold cavity.

Member 12 is in the form of a hollow cylinder, or it may be oval, or square, or octagonal, or any other shape, depending on the shape to be imparted to the finished article. Member 12 has an inner wall 122 which is adapted to receive the shoulders 108 and to fit snugly about the base 10. Member 12 also has a lower surface 124 which rests on platen 20 by which it is firmly supported. Annulus 12 also has an upper surface 126.

A movable intermediate mold section 14, located between an upper piston 16 and the mold member 12 is shaped and positioned to slide within the walls of cylinder 12. Section 14 has a stepped shape, which consists of a lower cylinder 142 integral with an upper cylinder 144. The outer surface of lower cylinder 142 is received in walls 122 and is adapted to slide freely up or down within the mold body portion 12. The lower cylinder 142 terminates in a shoulder 146 constituting the base of portion 144. During the molding step with the mold shown in FIGURES 1–7 the distance between shoulder 146 and surface 126 reduces to zero, as shown in FIGURE 7. Movable section 14 is provided with a stepped cavity consisting of a relatively large depression 150 hollowed from the core of cylinder 144 and continuing as a tapered passage 152, extending downwardly through cylinder 142, to the lower surface 156 of member 14. Passage 152 narrows to a small orifice 154 the size of which has been shown greatly exaggerated in the drawings. The sidewalls of passage 152 are tapered to provide a severable connection between the molding and the excess material which remains in the cavity in member 14.

The mold assembly is completed by a piston 16 which may be subjected to pressure by means not shown; for instance by a press platen. Piston 16 comprises a barrel portion 162 adapted to be slidingly received in cavity 150 and having a cross sectional area A greater than the area B in the main mold cavity (see FIG. 7) and may include projecting lugs or ears 168 having passages 166 adapted to receive pins from a pin plate (not shown) during the clearing of the mold (see FIG. 8). The inner face of piston 16 is provided with a keyway 164 as is usual in transfer molding.

It is believed that the method of molding will be apparent from the above. A preferred sequence of operations consists of the following steps:

(1) A preform P formed from approximately the amount of resinous molding powder or granules needed to form the finished molding, e.g. by pressing a conventional mineral filled phenolic powder composition in a conventional compression type mold or other similar known apparatus, at room temperature at 5,000–10,000 p.s.i. It is frangible and has not been subjected to sufficient heat to liquify or to cure the resin. The mold shown in FIGURE 10 exemplifies one type of apparatus which may be used to form the preform P.

(2) Mold piece 12 is positioned on base 20 as in FIGURE 2, snugly fitting around bottom plug 10.

(3) The preform P is placed in the mold as shown in FIGURE 3.

(4) Movable piece 14 is gently placed on the frangible resin cookie, preform P.

(5) Additional molding powder, about 3 or 4 times as much as is present in the preform is poured loosely into the hollow defined by 150 and 152.

(6) Force is applied to piston 16 to close the mold and movable member 14 moves into contact with cylinder 12 because Area A is greater than Area B and hence there is greater force on the upper side of member 14 than on its lower side. Movable member 14 is caused to move so that shoulder 146 is brought into physical contact with surface 126 and the clearance between them is reduced to zero. At the same time, heat is applied to the mold assembly and its contents so that the plastic can flow under the influence of the prevailing force and so as to complete the cure of the resin. The heating may be effected by means of the press platens shown in dashed lines above piston 16 and below base 10 in FIGURE 7, or by any other conventional means.

Depending on the amount of material in the preform, one of several alternatives will occur. If an excess amount of material is present in the preform, the movement of member 14 against cylinder 12 displaces the excess material upward through tapered passage 152. If on the other hand, the preform contains less than the required amount of material, piston 16 forces some of the material in cup 150 down through passage 152 and into the cavity containing the preform.

Since the molded material is free to flow in either direction through passage 152, the clearance between shoulder 146 and 126 will always be diminished to zero, and hence the height, the dimension between surfaces 104 and 156 is a constant and closely controlled amount. The tip of passage 152 is negligible in size so that the finished molding shown in FIGURE 12 is readily separated from the remainder of the molding material in the charge.

One method of clearing the mold is shown schematically in FIGURE 8 wherein the mold members 12 and 16 are shown in modified form, the diameter of 16 having been increased a small amount and the diameter of 12 having been increased to a somewhat greater extent. The mold assembly is rested on a solid plug 130 having a smaller diameter than member 10 and pressure is applied on surfaces 126 to cause member 12 to move downwardly and the molded article M to move upwardly relative to 12. This will strip part 12 from the assembly and permit easy separation of part 10 and molding M. Parts 14 and 16 may then be separated by resting the ears or lugs 168 on a hollow cylinder having an internal diameter greater than the outer diameter of cylinder 144 and then pressing firmly on part 14 with a pin plate whose pins pass through holes 166 in ears 168. The excess molding material in cavities 150 and 152 remains attached to piston 16 because of keyway 164. After separation of part 14 from piston 16, this may be readily broken away from the keyway.

As shown in FIGURE 9 the height of the molding may be varied by means of washers 18 placed on surface 126 of cylinder 12.

FIGURE 10 shows a compression mold after charging and before piston 16 is caused to exert pressure on the charge. When pressure is exerted, the dimensions of the molded article will depend on the amount of material in the mold. The amount of material in the mold is usually weighed and hence is only as accurate as the weighing device and procedure. In mass production methods, charges weighed to plus or minus 5% which are considered sufficiently accurate for most purposes would not suffice for the present dimension control and more precise and time-consuming weighing operations would be required. Even so any variations in temperature or pressure will in turn produce variations in the height of the molding.

Various expedients have been suggested to improve the molding produced by compression molding. To avoid overfilling, a port may be provided to void excess material. This often leads to porosity in the finished molding, in the vicinity of the port, if it does not result in an entire loss of pressure on the molded article. Further the amount of flow involved in compression molding a loose charge of molding powder or granules is such that "sloppy" non-uniform moldings may be produced.

FIGURE 11 shows a comparable transfer mold. Difficulty is experienced in obtaining uniform properties in the molded material due to turbulent flow in the mold, which must be filled in a very short interval while the thermosetting resin is fluid.

The description above is directed by way of illustration, to the molding of a cylindrical or disc shaped object. It will be readily understood that other configurations can be handled in suitably shaped molds and that the mold shown is susceptible of modification ot some extent without departing from the spirit of my invention. For example, instead of bringing shoulders 146 and 126 into registry as in FIGURE 7, the mold cavity may be provided with an insert positioned on plug 10 and having the height desired in the molding, and the lower surface 156 of part 14 may be brought to bear on such an insert to produce a molded product with the controlled dimension.

FIGURE 13 shows the invention applied to molding halves of long cylinders, the cylinder being halved along its axis. In the finished article, two such halves are placed with their flat surfaces touching, so as to fit snugly in a machined cylindrical hole. The mold forces must close against the cut through the center of the cylinder and against the semicylindrical outer wall respectively. In FIGURE 13, the amount of flash has been shown exaggerated for purposes of illustration. The dimension between these two faces, which was determined by the closure of the mold forces is controlled accurately otherwise the assembly would be impractical because the two halves when put together would not have a circular cross-section. Using the mold of FIGURE 13, the desired close tolerances were attained on a production basis.

I claim:

1. A method of producing moldings of a uniform dimension especially the dimension determined by closure of the mold forces which comprises: forming a preform by cold pressing a molding composition an amount sufficient to produce a coherent product but not sufficient to liquify or cure the composition; charging the cold pressed molding composition into the cavity of a mold body; placing an intermediate mold member into the mold so that it rests on the upper surface of the molding composition, said member having a shoulder portion spaced from the upper surface of the mold body; pouring additional molding material into a cavity extending through the intermediate member and to the upper surface of the initially charged cold pressed self-sustaining body of molding material; and thereafter simultaneously applying heat and pressure to the additional molding material, whereby said shoulder portion of the intermediate mold member moves into physical contact with the upper surface of said mold body and said mold forces close to the predetermined extent.

2. A molding apparatus for molding thermosetting materials with extreme dimensional accuracy and limited flow of said materials into the mold, said apparatus consisting of a fixed base having vertically extending wall portions said base and said wall portions defining a molding cavity adapted to receive a material to be molded and an upper shoulder area; an intermediate member slidably received in said vertically extending walls, a central bore extending through said member, said bore terminating in an enlarged shallow cup-shaped recess at the upper end of the bore, said intermediate member having a stepped shape complementary to the molding cavity defined by the fixed base and vertically extending walls, said intermediate member being positioned so as to be spaced from the upper shoulder area of the base prior to the application of pressure to said movable intermediate member and therefore being slidable into and out of one portion of said molding cavity, and a piston adapted to slide within the vertically extending walls of said cup-shaped recess and to apply pressure to material to be molded located in said recess and thereby to cause said slidable member to move relative to said fixed base and into engagement with the shoulder constituting an upper surface of said base, the cross sectional area of the face of said piston being greater than the cross sectional area in the molding cavity formed by said vertically extending walls, measured in a plane perpendicular to the direction of motion of the press platens.

3. A method of producing moldings of a uniform dimension especially the dimension determined by closure of the mold forces which comprises: cold pressing a molding composition to the approximate shape desired in a finished article; charging the cold-pressed shaped product into the mold cavity of a mold base; inserting a slidable member into said cavity in the mold and resting on the upper surface of the cold-pressed product, said member having a shoulder portion spaced from a complementary surface of the mold base; pouring molding powder into a cavity extending through the member and to the upper surface of the cold-pressed product; and thereafter simultaneously applying heat and pressure to the added molding powder and to the slidable member, whereby clearance between the said shoulder portion of the slidable member and the complementary surface portion of the mold is reduced to zero.

4. A method of producing moldings wherein the dimension determined by closure of the mold forces is precisely determined, which method comprises: charging solid material to be molded into a mold cavity, the amount of said material being approximately equal to the amount of material in the desired molded article; inserting a slidable member into said cavity in the mold and resting it on the upper surface of the solid material charged into said cavity, said slidable member having a shoulder portion spaced from a complementary surface of the mold base, and having a central bore extending from said mold cavity and through said member, said bore terminating in an enlarged cup-shaped recess at the upper end of the bore and adapted to receive a piston slidably therein, the cross sectional area of the face of said piston being greater than the cross sectional area in the molding cavity, measured in a plane parallel to the face of said piston and perpendicular to the direction of motion of said piston when it slides in said cup-shaped recess; pouring molding powder into the centrally located bore in said slidable member and onto the upper surface of the material previously charged into said mold cavity; and thereafter simultaneously applying heat and pressure to the added molding powder and to the slidable member, whereby clearance between the shoulder portion of the slidable member and the complementary surface portion of the mold is reduced to zero.

References Cited in the file of this patent
UNITED STATES PATENTS

| 2,279,208 | Shaw | Apr. 7, 1942 |
| 2,420,709 | Kopplin | May 20, 1947 |
| 2,436,993 | Fisher | Mar. 2, 1948 |
| 2,847,712 | Pollard et al. | Aug. 19, 1958 |
| 2,961,705 | Wacker | Nov. 29, 1960 |
| 2,969,563 | Hendry | Jan. 31, 1961 |